(12) United States Patent
Nelson et al.

(10) Patent No.: US 7,424,710 B1
(45) Date of Patent: Sep. 9, 2008

(54) TCP/IP OFFLOADING FOR VIRTUAL MACHINES

(75) Inventors: Michael Nelson, Alamo, CA (US); Mallik Mahalingam, Sunnyvale, CA (US); Ramu Arunachalam, Foster City, CA (US)

(73) Assignee: VMware, Inc., Palo Alto, CA (US)

( * ) Notice: Subject to any disclaimer, the term of this patent is extended or adjusted under 35 U.S.C. 154(b) by 744 days.

(21) Appl. No.: 10/741,244

(22) Filed: Dec. 18, 2003

Related U.S. Application Data

(60) Provisional application No. 60/434,603, filed on Dec. 18, 2002.

(51) Int. Cl.
*G06F 9/455* (2006.01)

(52) U.S. Cl. .......................... 718/1; 718/105; 719/313; 719/319; 719/321; 719/327

(58) Field of Classification Search ...................... 718/1, 718/105; 719/313, 319, 321, 327
See application file for complete search history.

(56) References Cited

U.S. PATENT DOCUMENTS

| | | | | |
|---|---|---|---|---|
| 5,692,193 A * | 11/1997 | Jagannathan et al. | ......... | 718/106 |
| 6,658,564 B1 * | 12/2003 | Smith et al. | ................. | 713/100 |
| 7,111,303 B2 * | 9/2006 | Macchiano et al. | ......... | 719/313 |
| 2004/0010787 A1 * | 1/2004 | Traut et al. | ..................... | 718/1 |

* cited by examiner

*Primary Examiner*—Andy Ho
(74) *Attorney, Agent, or Firm*—Jeffrey Pearce; Leonard Heyman

(57) ABSTRACT

An engine (TOE) is provided in a virtualized computer system for offloading I/O tasks using any defined protocol such as TCP/IP. The system includes a virtual machine (VM), which has a guest operating system (OS) that runs via a virtual machine monitor (VMM) on a system-level software platform (vmkernel), which also forms the software interface layer to at least one physical network connection device. A TCP/IP stack is included in vmkernel. During normal I/O operation, for sockets associated with TOE, processes in an application layer in the guest OS are able to communicate directly with vmkernel's TCP/IP stack, thereby bypassing the guest OS kernel.

16 Claims, 7 Drawing Sheets

US 7,424,710 B1

TCP/IP OFFLOADING FOR VIRTUAL MACHINES

CROSS-REFERENCE TO RELATED APPLICATIONS

This application claims priority of U.S. Provisional Patent Application No. 60/434,603, filed 18 Dec. 2002.

BACKGROUND OF THE INVENTION

1. Field of the Invention

This invention relates to the field of virtual computers, especially networking in virtualized systems.

2. Background Art

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files.

Virtual Computers

As is well known in the field of computer science, a virtual machine (VM) is a software abstraction—a "virtualization"—of an actual physical computer system. FIG. 1 illustrates the main components of one type of virtualized computer system. As with any other computer system, a virtualized computer runs on a system hardware platform 100, which includes one or more processors (CPUs) 110, system memory 140, and at least one storage device, which will typically be a disk 114. The system memory 140 will typically be some form of high-speed RAM, whereas the disk (one or more) will typically be a non-volatile ("persistent") mass storage device. The hardware 100 will also include other conventional mechanisms such as a memory management unit MMU 116, and one or more conventional network connection device(s) such as a network adapter or network interface card 172—"NIC"—for transfer of data between the various components of the system and one or more external systems such as servers 710 via a bus or network 700.

In the system shown in FIG. 1, a system software layer 200 includes a host operating system 220 or some analogous software that performs the hardware-interface, resource-allocating and control functions of an operating system, which will include drivers 222 as needed for various connected devices 400. A display device and input devices such as a keyboard, mouse, trackball, touchpad, etc., (not shown) are usually also included among the devices for obvious purposes. The disk(s) 114 and the NIC(s) 172 are of course also devices, but are shown separately because of their relative importance. The operating system (OS) 220 may be any known OS and will therefore have all typical components. User-level applications 300 may be installed to run on the host operating system 220.

One or more virtual machines 500 are installed to run on the hardware platform 100. The VMs either alone or in combination with respective, supporting virtual machine monitors VMMs (see below), are referred to here as "guests;" only one guest is shown, for simplicity. Two configurations are in general use—a "hosted" configuration, illustrated in FIG. 1, in which an existing, general-purpose operating system (OS) 220 forms a "host" OS that is used to perform certain I/O operations; and a non-hosted configuration, illustrated in FIG. 2, in which a kernel 800 customized to support virtual computers takes the place of the conventional operating system. Of course, the kernel could be considered to be a host, but the configuration is often referred to as being "non-hosted" simply to highlight that the VM and VMMs have specialized system-level support as opposed to relying on existing, stock operating systems. The main components of these two configurations are outlined below.

Each VM 500 will have both virtual system hardware 501 and guest system software 502. The virtual system hardware 501 typically includes at least one virtual CPU 510, virtual system memory 512, at least one virtual disk 514, and one or more virtual devices 540. Where the VM is to communicate via the network, it will also have at least one virtual NIC (572). All of the virtual hardware components of the VM may be implemented in software using known techniques to emulate the corresponding physical components.

The guest system software 502 includes a guest operating system 520, which may simply be a copy of a conventional operating system. As with any other operating system, the guest operating system will have a body of code that performs its core functions; this body of code is typically referred to as the OS "kernel." Along with the kernel, an operating system such as those in the Windows family will typically expose various features to applications running on it. For example, at least one application programming interface (API) is usually made available to applications so that they can access and communicate with corresponding features and request the operating system to perform certain built-in functions. On the other "side," drivers are usually installed as needed into the operating system to allow the operating system to correctly communicate with both physical and logical (and thus also virtual) devices. Since the operating system does not "know" what the device is, a driver may also be installed to enable communication between the operating system and other software entities as well; this possibility is exploited in this invention. In FIG. 1, drivers 522 are shown installed in the guest OS 520.

If the VM is suitably designed, then it will not be apparent to the user that any applications 503 running within the VM are running indirectly, that is, via the guest OS 520 and virtual processor(s) 510. Applications 503 running within the VM will act just as they would if run on a "real" computer, except for a decrease in running speed that will be noticeable only in exceptionally time-critical applications. Executable files will be accessed by the guest OS 520 from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines are well known in the field of computer science.

Some interface is usually required between a VM and the underlying host platform (in particular, the CPU(s) 110), which is responsible for actually executing VM-issued instructions and transferring data to and from the actual memory 140 and storage devices 114. A common term for this interface is a "virtual machine monitor" (VMM), shown as component 600. A VMM is usually a thin piece of software that runs directly on top of an intermediate host, or directly on the hardware, and virtualizes at least some of the resources of the physical host machine. The interface exported to the VM is then the same as the hardware interface of the machine (or at least of some machine), so that the guest OS 520 cannot determine the presence of the VMM.

The VMM 600 also usually tracks and either forwards (to some form of operating system) or itself schedules and handles all requests by its VM for machine resources, as well as various faults and interrupts. A mechanism known in the art as an interrupt or exception handler 630 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

As mentioned above, depending on how the VM is configured, the VMM may be kept transparent to the VM, and thus also to the user of applications running in the VM. Total transparency of VMM and the underlying supporting components is not usually maintained or even desirable in all virtualized systems, however; rather it may be advantageous in some cases, sometimes known as "para-virtualization" systems, for the guest OS to be provided with an explicit interface to the VMM. In such systems, the VMM is sometimes referred to as a "hypervisor." This invention, for example, uses a special driver (vmxnet 524, described below) within the guest OS 520 to enable certain features.

The VM and VMM are shown in the figures as separate components for the sake of clarity. Together, each VM/VMM pair may be considered to form a single "virtual computer" which may in turn be considered to be the "guest." The term "guest" is used here, however, to refer to the VM and its various components, although this choice of terminology is made for convenience and not by way of exclusive definition or limitation. There may be several VM/VMM pairs running on a common host; a single VM/VMM pair 500/600 is shown in FIGS. 1 and 2 for simplicity.

Moreover, the various virtualized hardware components such as the virtual CPU(s) 510, the virtual memory 512, the virtual disk 514, and the virtual device(s) 540 are shown as being part of the VM 500 for the sake of conceptual simplicity—in actual implementations these "components" are usually constructs or emulations exposed to the VM by the VMM, for example, as emulators 640. One advantage of such an arrangement is that the VMM may be set up to expose "generic" devices, which facilitate VM migration and hardware platform-independence.

Hosted Virtual Computers

The configuration illustrated in FIG. 1 is used in the Workstation product of VMware, Inc., of Palo Alto, Calif. In this configuration, the VMM 600 is co-resident at system level with the host operating system 220 such that both the VMM and the host OS 220 can independently modify the state of the host processor. However, the VMM calls into the host OS via a special one of the drivers 222 and a dedicated one of the user-level applications 300 to have the host OS 220 perform certain I/O operations of behalf of the VM. The virtual computer in this configuration is thus hosted in that it runs on an existing host hardware platform 100 together with an existing host OS 220. A hosted virtualization system of the type illustrated in FIG. 1 is described in U.S. Pat. No. 6,496,847 (Bugnion, et al., "System and Method for Virtualizing Computer Systems," 17 Dec. 2002), which is incorporated here by reference.

Non-hosted Virtual Computers

In other, "non-hosted" virtualized computer systems, a dedicated kernel 800 takes the place of and performs the conventional functions of the host OS, and virtual computers run on the kernel. FIG. 2 illustrates such a configuration, with a kernel 800 that serves as the system software layer for the VM/VMM 500/600 pairs, only one of which is shown for the sake of simplicity. Compared with a system in which VMMs run directly on the hardware platform 100, use of a kernel offers improved performance because it can be co-developed with the VMMs and be optimized for the characteristics of a workload consisting of VMMs (and their supported VMs). Moreover, a kernel can also be optimized for I/O operations and it facilitates provision of services that extend across multiple VMs (for example, for resource management). The ESX Server product of VMware, Inc., has such a configuration.

At boot-up time, an existing operating system 220 (which may be of the same type as the host OS 220 in the configuration of FIG. 1) may be at system level and the kernel 800 may not yet even be operational within the system. In such case, one of the functions of the OS 220 may be to make it possible to load the kernel 800, after which the kernel runs on the native hardware 100 and manages system resources using such components as various loadable modules and drivers 810, a memory management unit 818, at least one interrupt and exception handler 815, etc.

In effect, the kernel, once loaded, displaces the OS 220. Thus, the kernel 800 may be viewed either as displacing the OS 220 from the system level and taking this place itself, or, equivalently, as residing at a "sub-system level." When interposed between the OS 220 and the hardware 100, the kernel 800 essentially turns the OS 220 into an "application," which has access to system resources only when allowed by the kernel 800. The kernel then schedules the OS 220 as if it were any other component that needs to use system resources.

The OS 220 may also be included to allow applications 300 unrelated to virtualization to run; for example, a system administrator may need such applications to monitor the hardware 100 or to perform other administrative routines. The OS 220 may thus be viewed as a "console" OS (COS) or "service console." In such implementations, the kernel 800 preferably also includes a remote procedure call (RPC) mechanism and/or a shared memory area to enable communication, for example, between the VMM 600 and any applications 300 installed to run on the COS 220.

The console OS 220 in FIG. 2 is labeled the same as the host OS 220 in FIG. 1. This is to illustrate that, usually, at most only minor modifications need to be made to the OS 220 kernel in order to support either the host and non-hosted virtualized computers. In fact, at least in the virtualization products of VMware, Inc., "off-the-shelf" commodity operating systems such as Linux and Microsoft Windows may be used as the host or console operating systems.

The kernel 800 handles not only the various VM/VMMs 500/600, but also any other applications running on the kernel, as well as the console OS 220 and even the hardware CPU(s) 110, as entities that can be separately scheduled. Each schedulable entity may be referred to as a "world," which contains a thread of control, an address space, machine memory, and handles to the various device objects that it is accessing. Worlds, represented in FIG. 2 within the kernel 800 as module 812, are stored in a portion of the memory space controlled by the kernel. Each world also has its own task structure, and usually also a data structure for storing the hardware state currently associated with the respective world.

There will usually be different types of worlds: For example, one or more system worlds may be included, as well as idle worlds, one per CPU. Another world would be a console world associated with the COS 420. Each virtual computer (VM/VMM pair) would also constitute a world.

Binary Translation Vs. Direct Execution

As is known, for example, from U.S. Pat. No. 6,397,242 (Devine, et al., 28 May 2002), which is incorporated here by reference, some virtualization systems allow VM instructions to run directly (in "direct execution" mode) on the hardware CPU(s) when possible. When necessary, however, VM execution is switched to the technique known as "binary translation," during which the VM is running in the VMM and the VM instructions are converted—translated—into a different instruction or instruction sequence, for example, to enable execution at a safe privilege level. The VMM 600 is therefore shown in FIG. 1 (and assumed in FIG. 2) with a direct execution engine 610, a binary translator 612, and a translation cache 613 which holds the sequences of translated instructions; the VMM will generally also include these components in non-hosted systems.

In the system described in U.S. Pat. No. 6,397,242, for the sake of speed, VM instructions are normally allowed to execute directly. The privilege level of the VM is, however, set such that the hardware platform does not execute VM instructions that require a greater privilege level than the VM is set at. Instead, attempted execution of such an instruction causes the platform to issue a fault, which the VMM handles in part by switching VM execution to binary translation. Direct execution is then resumed at a safe point in the VM instruction stream. This dual-execution mode feature may be used in both hosted and non-hosted configurations of the virtualized computer system.

Virtual and Physical Memory

The address space of the memory 140 is usually partitioned into pages, regions, or other analogous allocation units. Applications address the memory 140 using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address the physical memory 140. The same offset is usually used in both a VA and its corresponding PA, so that only the VPN needs to be converted into a corresponding PPN.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by an application 503 in the VM 500 is remapped twice in order to determine which page of the hardware memory is intended. The first mapping is provided by a mapping module 523 within the guest OS 520, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory 140 must ultimately be generated. A memory management module 605, located typically in the VMM 600, therefore performs the second mapping by taking the GPPN issued by the guest OS 520 and mapping it to a hardware (or "machine") page number PPN that can be used to address the hardware memory 140. This GPPN-to-PPN mapping may instead be done in the main system-level software layer (such as in a mapping module in a memory management unit in the kernel 800), depending on the implementation. From the perspective of the guest OS, the GVPN and GPPN might be virtual and physical page numbers just as they would be if the guest OS 520 were the only OS in the system. From the perspective of the system software, however, the GPPN is a page number that is then mapped into the physical memory space of the hardware memory as a PPN.

The addressable space of the disk(s) 114, and therefore also of the virtual disk(s) 514, is similarly subdivided into separately identifiable portions such as blocks or sectors, tracks, cylinders, etc. In general, applications do not directly address the disk; rather, disk access and organization are tasks reserved to the operating system, which follows some predefined file system structure. When the guest OS 520 wants to write data to the (virtual) disk 514, the identifier used for the intended block, etc., is therefore also converted into an identifier into the address space of the physical disk 114. Conversion may be done within whatever system-level software layer that handles the VM, either the VMM 600, the host OS 220 (under direction of the VMM), or in the kernel 800.

Problem of Network Performance

One of the most challenging parts of kernel-based virtualization systems such as the ESX product of VMware, Inc. of Palo Alto, Calif., illustrated in simplified form in FIG. 2, is providing good networking performance. Previous work in improving networking performance has focused on a NIC driver in the guest VM 500. This means that all protocol processing is done by the guest OS 520. Unfortunately, there are high virtualization overheads associated with running the guest networking code. This limits the ability to close the performance gap between native networking and virtual machine networking. The most interesting protocol is TCP/IP (Transmission Control Protocol/Internet Protocol) since this is the dominant protocol, although similar problems will generally exist with other protocols as well.

With the introduction of 10 Gigabit Ethernet, NIC manufacturers are providing a TCP/IP offload engine (TOE) on the NIC. This allows an operating system to offload most TCP/IP protocol processing to the NIC. This greatly reduces the CPU overhead associated with this processing.

These TOEs provide an opportunity to greatly improve networking performance—there should be a reduction in virtualization overhead for networking because the protocol stack will be running in hardware. Unfortunately, TOEs are not available today on 100 Mbit or 1 gigabit cards. In addition, even with a TOE in hardware there may still be significant virtualization overheads associated with using the TOE because of the work done in the guest OS kernel before it hands data off to the TOE.

What is needed is a software TOE that can be used to improve virtual machine networking performance. This invention meets this need.

SUMMARY OF THE INVENTION

A computer has a host hardware platform, a system software layer ("vmkernel") mediating I/O requests to the host hardware platform, and at least one virtual computer running on the vmkernel. The virtual computer comprises a virtual machine (VM) and a virtual machine monitor (VMM) that forms a software interface between the VM and the vmkernel. The VM includes a guest operating system (OS), which in turn includes a guest kernel and an application layer. A vmkernel TCP/IP (or other protocol) stack is located in vmkernel and at least some I/O requests from the application layer are directed the vmkernel stack, bypassing the guest kernel.

The guest operating system has a native protocol stack and the application layer typically comprises a plurality of applications. I/O requests from any application in the application layer are then directed for handling by either the native protocol stack or the vmkernel TCP/IP stack on the basis of an identification of the application rather than on the basis of an intended connection.

Where the computer has a plurality of I/O ports ordered by port numbers, the port space is partitioned such that the ports associated with the native protocol stack are distinct from the ports associated with the vmkernel TCP/IP stack.

In computers in which a plurality of virtual computers are installed to run on the vmkernel, a separate vmkernel TCP/IP stack is preferably established for each virtual computer. I/O requests from the application layer of each virtual computer are then directed to the respective protocol stack in the system software layer. According to a further, optional feature of the invention, I/O requests from the application layer of one of the virtual computers are offloaded to the protocol stack of another one of the virtual computers, bypassing normal network packet processing done by any of the vmkernel TCP/IP stacks.

A common data structure and at least one I/O buffer are preferably stored in a memory such that the common data structure and the I/O buffer are addressable by both the application layer and the vmkernel. I/O commands stored in the common data structure by the application layer are thereby accessible to the vmkernel TCP/IP stack and data stored in the I/O buffer is accessible to both the vmkernel TCP/IP stack and the application layer without mediation by the guest kernel.

In some cases, an application may be blocked during an I/O request because a corresponding socket is either not readable or not writable. To unblock the blocked application (for example when the socket again can be written to or read from), an interrupt may be issued from the vmkernel to a driver installed in the guest OS. The driver then issues an unblocking notification to the application.

DESCRIPTION OF THE INVENTION

In broadest terms, this invention provides an offload engine in virtualized computers systems for network communication using any defined protocol. The term "TCP/IP Offload Engine" and its abbreviation TOE are used below with reference to different embodiments of the invention. This term is used collectively in that it is not a single software component, but is rather a collection of components that cooperate to perform the offloading functions of the invention. Thus, as will become clearer from the discussion below, the invention involves a set of components that together operate as an engine for offloading a TCP protocol suite stack.

Protocol

Because of its prevalence, the invention is described below in terms of the TCP/IP protocol, but this is by way of common example only; skilled programmers will know how to adjust the invention to accommodate other protocols as well. Other common, known protocols include, for example, UDP/IP and RAW/IP.

Architecture

Figure 1:
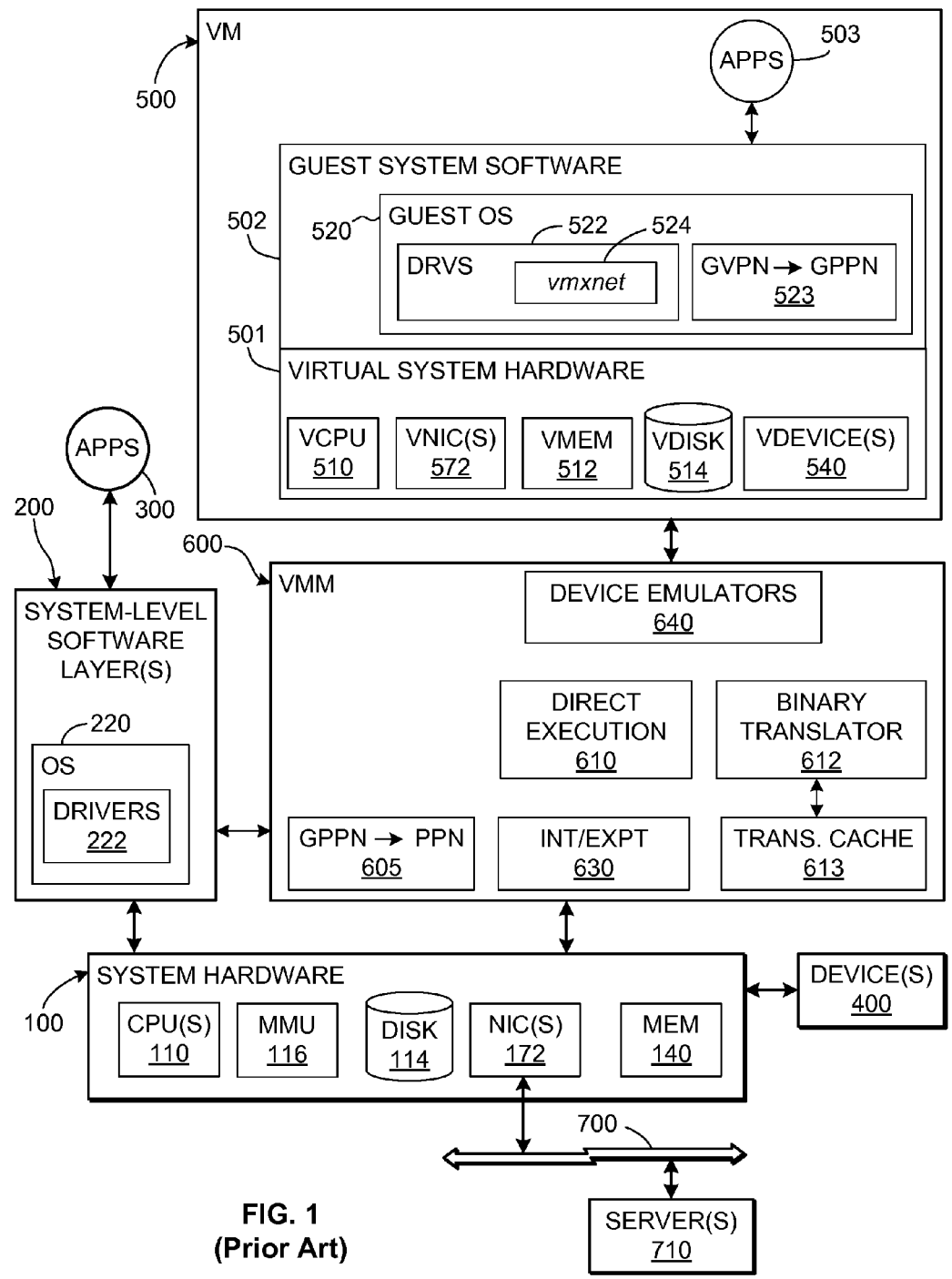
FIG. 1 illustrates a "hosted" virtualized computer system.
Figure 2:
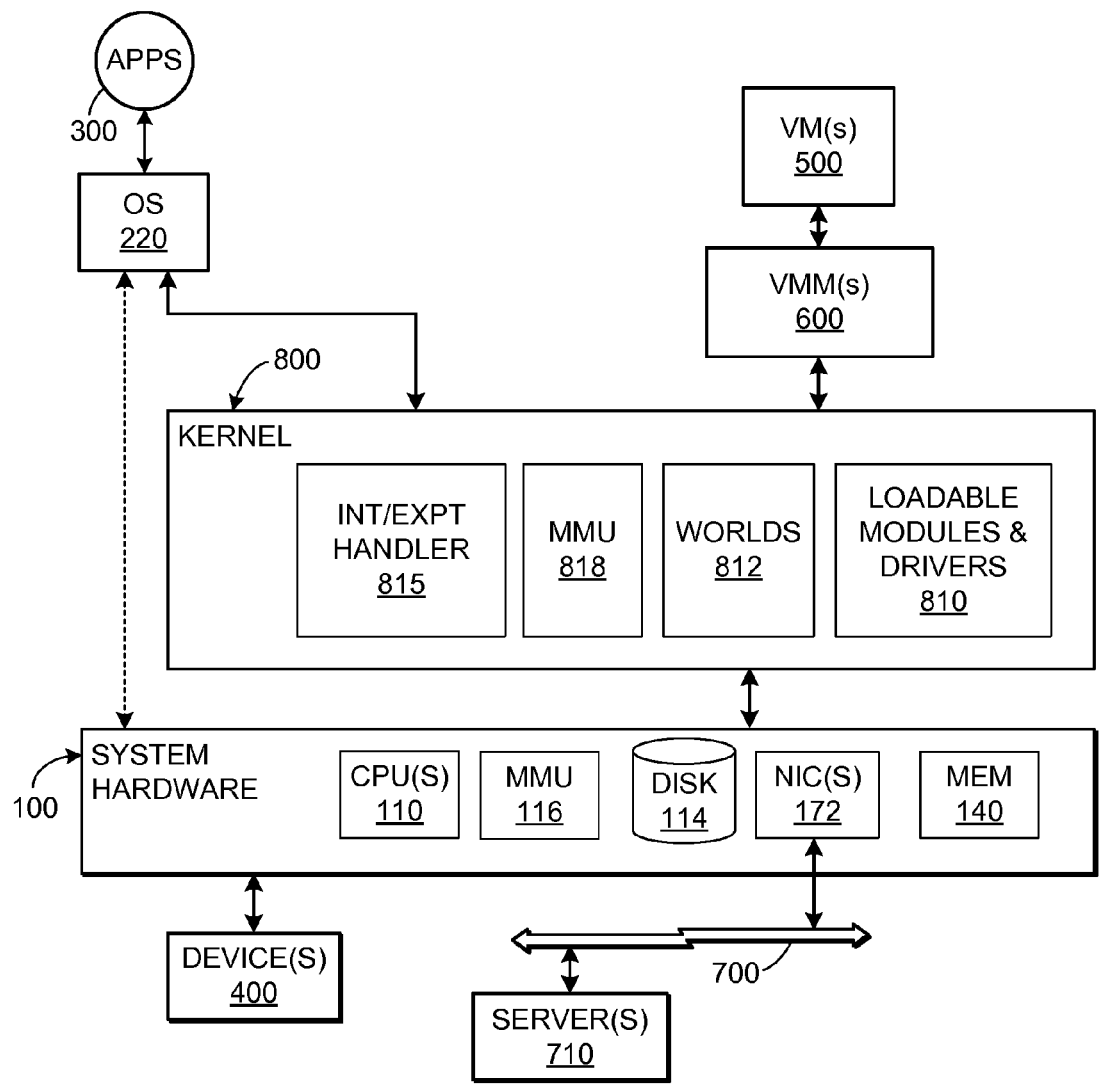
FIG. 2 shows the main components of a "non-hosted" virtualized computer system.

There are several ways to build a TOE for a kernel-based virtualization system such as in FIG. 2, with the general VM and VMM components shown in FIG. 1. One architecture is discussed first below, followed by a discussion of alternatives and extensions. Various prototypes of the invention were tested and/or implemented in the VMware ESX system. The invention is therefore described below primarily with reference to this system (ESX). However, the principles of the invention may be applied to other kernel-based virtualization systems as well.

Solely by way of example, the architecture according to the invention is discussed with reference to a guest VM that runs the Microsoft Windows environment. Similar ideas can be used on other guests running more flexible and modifiable operating systems like Linux.

Windows provides what is known as "Layered Service Provider" model, in which any service provider (in the form of a dynamically linked library—DLL) can register for handling protocol requests originate from Windows socket applications. Microsoft Windows has this notion of service providers for various protocol families such as TCP/IP, UDP/IP, RAW/IP, etc. A service provider can register with windows to handle requests for any of the supported protocol families by exporting well documented APIs and registering the entry points with the Windows socket framework. This model allows intercepting any standard Windows socket calls made by user-level applications. The way in which these features are used by the different embodiments of the invention are explained below.

Typically when the application runs code, it runs in direct execution mode on the bare hardware. When the guest operating system runs kernel code, however, it is at CPL0 (the most privileged level) and runs in the binary translation mode. In addition, there can be expensive system-level operations such as page table management that have very high overheads. Thus, in order to get the best possible performance, the guest operating system kernel is preferably bypassed whenever possible. This means that an application at user level should be able to communicate directly with the TOE without transitioning to the guest operating system kernel. Note that, even though in the existing systems, Windows socket applications are able to communicate with the Winsock component (namely, msafd.dll), which is a user level component, the actual network processing is done in the guest operating system kernel when the call makes a transition from user space to guest kernel space and executes appropriate code in the guest kernel. This way of transitioning from user space to guest kernel space and executing the code in the guest kernel adds considerable overhead to I/O operations in virtual machines.

The basic idea of the invention is to allow an application running in a VM to send and receive data without transitioning to the guest operating system kernel whenever possible. When a user level application blocks execution on sends (for example, due to lack of buffer space) or receives (for example because there is no data available to receive), a poll request is issued to vmkernel TCP/IP stack 850 with a unique context. The context is basically a guest kernel handle of the event object that the user level application will be waiting on. When a poll condition is met, the vmkernel TCP/IP stack 850 raises a virtual interrupt to notify the vmxnet driver with this context value. Upon receiving the virtual interrupt, vmxnet signals the event object, which "wakes up" the waiting user level application. Although a driver vmxnet 524 is installed in the guest OS kernel 521 (see FIG. 3) for initialization and certain error-handling tasks, "normal," unblocked offloading can bypass the guest OS kernel (as well as the installed driver) altogether such that an application layer 1500 within the guest can communicate directly with a TCP/IP stack in an underlying host layer.

Figure 3:
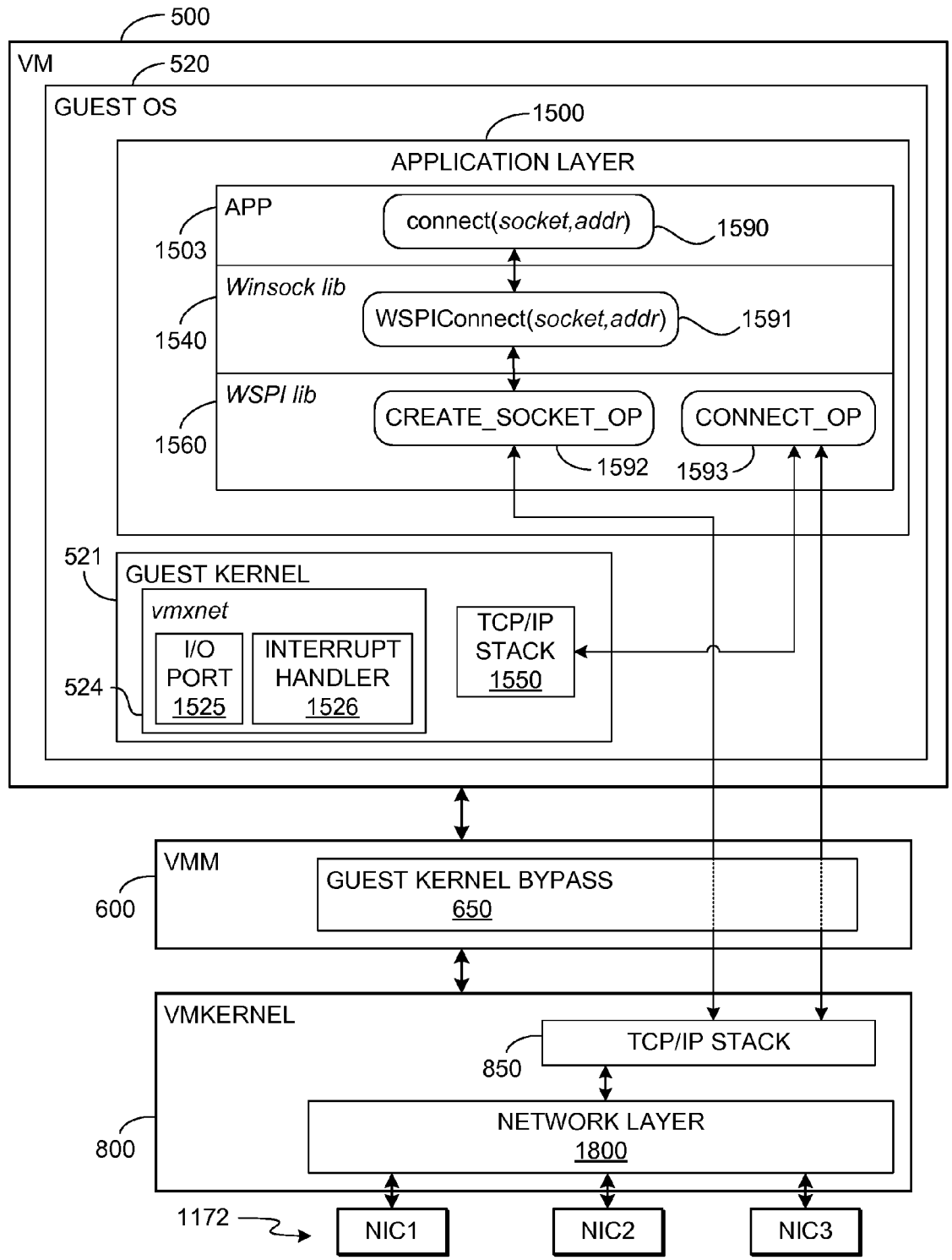
FIG. 3 illustrates connecting to a remote endpoint, including creating a local TOE socket (end point).

As FIG. 3 illustrates, there are six main pieces to the architecture for the TOE in the illustrated embodiment of the invention:

1) An application layer 1500, including the Winsock library 1540. Although part of the operating system, the notion of an application layer as separate from the OS kernel is well understood in the prior art;
2) A driver 524 (called here vmxnet) in the guest OS 520;
3) The virtual machine monitor (VMM) 600;
4) The kernel 800, referred to here as "vmkernel" that performs the functions of an operating system kernel for virtual machines running on it, as opposed to the kernel in, for example, the guest operating system itself.
5) A region 142 of data in memory that is shared between the application layer 1500, the guest driver 524, and the VMM; and
6) A TCP/IP stack 850 that resides in the vmkernel 800.

Note that all of these pieces are either software constructs and as such are sets of either code or data stored in memory. To say that a software component or data set resides or is in an entity such as the vmkernel, VM, VMM, etc., therefore means that it is either part of the code defining or is within the addressable memory space of that entity. As is explained further below, certain memory regions may also be shared, that is, accessible by, more than one entity, even at different privilege levels.

Sockets and Ports

All operations that can be offloaded are invoked on sockets. A well-known concept, a socket is a unique identification to or from which information is transmitted in the network, and usually consists of a handle (name) and an address. In essence, a socket is an endpoint in a connection for communication between two entities over a network. Sockets are typically created and used with a set of programming requests or "function calls" that define an application programming interface (API). Sockets can also be used for communication between processes within the same computer as well as between processes remote from one another.

Although this description refers to "sockets," it is to be understood that invention may operate with any analogous descriptor. In any case, communication over the network is from one socket to another socket, each socket being identified with a process running at a known host. In the illustrated embodiment of the invention, sockets are in the application layer 1500 and the TCP/IP stack 850 that is used for offloading presents a socket interface as well.

On modern computers, a "port" is a place for being physically connected to some other device, usually via a socket and plug of some kind. The term is also extended to logical connections, however, so as to be a "place" of logical connection to the network. The TCP/IP protocol defines ports, many of which have numbers preassigned by convention. When a service such as a server program is started, it is said to bind to its designated port number. Any client program that wants to connect to that server must then also issue a connect request to the designated port number. As an example, by convention, port 80 is reserved for HTTP, so that it does not need to be specified in the Uniform Resource Locator (URL).

Applications create sockets and then perform operations on the sockets. In one implementation of the invention, the operations that can be invoked on sockets included:

1) Bind (<IP address, port>): Registers for specific port on which the connections can be accepted. If a value of zero is specified for port, then an unused port value is used. As is well known, Bind() is a binding operation, which is an association between two or more entities indicating that the binding entity is ready to listen to (receive) requests through a specified IP address or interface, or otherwise identified entity, on a particular port.
2) Connect (@<IP address, port>): connect this socket to an endpoint at the given IP address and port number.
3) Accept: accept a connection on a socket. The result is a new socket that can be used to communicate to the endpoint that initiated the connection.
4) Listen: indicate a willingness to listen for new connections on a socket and give the maximum queue length.
5) Send: send data on a connected socket.
6) Receive: receive data from a connected socket.
7) Set socket opt: set an option for the socket. An example option is to set the receive buffer length.
8) Get socket opt: retrieve options for a socket.
9) Select: wait for a set of sockets to become readable, writeable, or exceptable.
10) Close: close down a socket.

Application Layer 1500

Applications perform network operations on sockets, which are implemented on Windows in the Winsock library 1540 that is dynamically linked into each application. Windows presents an API known as the Winsock Service API (WSAPI) that allows an entity to interpose on socket operations that are implemented by the Winsock library 1540. One mechanism that may be used to do this given the Winsock/WSAPI features is though a software construct known as a dynamically linked library (.dll) This is the mechanism (named VMTOE.dll below) that is used by the TOE architecture in the illustrated embodiment of the invention to bypass the guest operating system 520 kernel for most networking operations. As is discussed below, preferably only certain portions of the TCP/IP port space are handled by the TOE according to the invention, which uses a range of port values that does not overlap the range used by the Windows native stack 1550. All other ports are sent to the standard TCP/IP stack 1550 in the guest operating system. Port ranges are used typically for selecting an ephemeral port, that is, for selecting an unused port when bind is done with INPORT_ANY. One way for the vmkernel TCP/IP stack 850 to determine whether a given port is in use by the TOE or by the native TCP/IP stack 1550 is to use a port bit mask, for example, with a "1" entry indicating use by TOE and a "0" entry indicating that the port is not in use by TOE but rather by the native stack 1550.

Using any known methods, an administrator may designate which applications are to be offloaded via TOE during installation of TOE. When an application loads into guest memory, it then binds dynamically to VMTOE.dll. VMTOE.dll then determines (based on the administrators designation) whether that particular application should be offloaded through TOE and if so, from that point onwards directs all socket-specific calls are the vmkernel TCP/IP stack 850.

Most socket operations are sent directly to the TCP/IP stack 850 in the vmkernel 800. The shared memory, which is described below, is used to send and receive data as well as to pass parameters to the various socket operations. The driver 524 in the guest OS 520 is involved only in the allocating, and mapping shared memory on behalf of applications, for waking up applications that are waiting for sockets to become readable, writeable, or exceptable, and for destroying sockets when applications fail to do so.

Guest Driver

A driver is provided in the guest for two main purposes. First, the driver provides a mechanism for the vmkernel to wake up a waiting application when a socket becomes readable or writeable—the application cannot wait in the vmkernel because it would block execution of the guest OS; rather, the application must wait using guest OS mechanisms. The vmkernel therefore preferably raises a "wakeup" interrupt to the guest driver 524 which in turn wakes up any waiting applications using shared notification events.

The second main use of the vmxnet driver 524 is for tracking of sockets: If a guest application exits without closing any of its sockets, then the TCP/IP stack 850 in the vmkernel 800 must be notified so that it can close the corresponding socket.

The vmxnet driver 524 handles interfacing with the TOE according to the invention; the vmxnet driver 524 therefore preferably has the following features, which can be implemented using well known programming techniques:

1) It has an I/O port 1525 that can be used to initialize actions with the VMM 600 and/or vmkernel 800.

2) It has an virtual interrupt line and associated handler 1526 that can be used to sense interrupts raised to the guest by the VMM and/or vmkernel.

3) It is associated with a physical NIC 1172 in the vmkernel 800 that can be used to send and receive packets. The TOE should be associated with this same physical NIC 1172 as described below.

VMM

The virtual machine monitor 600 is responsible for interfacing between the application layer 1500 and the guest driver 524 on the one hand and the TCP/IP stack 850 on the other hand. Recall that the VMM will typically be aware of all VM actions. Using the offloading mechanism provided by this invention, it is not necessary for the VMM to actually process I/O requests other than preliminarily, to assist in establishing certain data structures and communications channels before offloading operations. Later, during offloading operations, the VMM needs only to ensure that requests are forwarded to the TCP/IP stack 850 and to raise interrupts to the guest, via the vmxnet driver 524, to issue "wakeup" calls to waiting applications as needed (see below). Because the invention allows guest I/O requests (in particular, to the network) to bypass the guest OS kernel 521, the forwarding component in the VMM is labeled in the figures as the guest kernel bypass module 650.

When an application, within or accessing the application layer 1500, or the guest driver 524 wants to perform a socket operation, it issues an I/O operation on the guest kernel bypass layer 650 in the VMM 600, which detects this I/O request using the same techniques used to detect other traps that are generated in the normal operation of a virtual computer. The VMM then forwards this request to the vmkernel TCP/IP stack 850.

vmkernel

The vmkernel 800 sends and receives packets on the physical NIC 1172 in that it both takes packets sent down to it from the guest and gives them to the physical NIC(s) 1172, and also takes incoming packets and copies the data into send and receive buffers accessible to the VM, the VMM and the kernel itself.

In the figures, the kernel 800 is shown as having a network layer 1800 between the stack 850 and the physical NIC(s) (three of which—labeled NIC1, NIC2, and NIC3—are shown by way of example). This network layer 1800 will include the code found in most non-hosted virtualized computers such as the VMware ESX Server product for conventional network interface operations; for example, the layer 1800 in the ESX product performs, among other functions, the function of an Ethernet switch.

Shared Data

In order to allow an efficient TOE implementation, data is shared between the DLL (VMTOE.dll), the guest driver 524, the VMM 600 and the kernel 800. In the prototype of the invention implemented in the ESX Server product, there was a shared data structure 142 (see FIG. 4) used to pass commands, parameters and results, as well as send and receive buffers 144, 146 used to transfer data. (These buffers may be combined.) Any data structure may be used for this purpose.

All of the shared data is pinned by the guest driver and also in the VMM. This shared memory is then mapped into the application layer's address space by the guest driver 524 using normal methods so that the mapping between a GVPN and the underlying GPPN is fixed. This allows the guest physical page numbers (GPPNs) behind the virtual addresses to be given to the VMM and vmkernel. These GPPNs are then pinned into the memory space of the guest OS 520 as well. In this manner the physical page numbers (used to address the actual, physical hardware) behind the shared data 142 are locked in memory and are passed to the vmkernel 800.

If the shared data structure 142 was not pinned, then there would be no guarantee that when the application layer 1500 called the VMM there would be a PPN behind the virtual address. Furthermore, even if there were a GPPN, there would be no guarantee that the guest OS would not be in the process of changing its virtual-to-physical page number mapping. Pinning of the shared data structure avoids this uncertainty. The addresses of the send and receive buffers 144, 146 are similarly pinned, for the same reasons.

Integration with Guest OS TCP/IP

The guest OS 520 will itself typically include a TCP/IP stack 1550 that is bound to one or more IP addresses; if not, then one can be created in the conventional manner. TOE shares the same network properties (IP addresses, routing table, etc.) as the guest TCP/IP stack. It achieves this by having vmxnet 524 query the native TCP/IP stack 1550 for network properties (via the standard TDI interface) and the collected network information is then passed down to the vmkernel TCP/IP stack 850. The network properties of the vmkernel TCP/IP stack 850 are always kept in sync with that of the guest TCP/IP stack 1550 by registering for network change events.

This approach of using one IP address, routing table, etc., for both the TOE stack 850 and the guest TCP/IP stack 1550 has a several advantages: As one example, standard Windows network management tools can manage the TCP/IP address; similar tools are found in other operating system environments. As another example, all operations such as DNS can go through the standard guest OS stack 1550. Furthermore, the invention avoids considerable network management complexity.

As is explained earlier, the guest TCP/IP port space is partitioned such that, for some ports, packets are sent to the guest OS TCP/IP stack 1550 and for some packets they are sent to the TOE. Applications for which high-performance networking is necessary are preferably sent through the TOE. For example, web servers, which listen on port 80, can be configured to be offloaded through TOE. Since web performance is very important, the invention preferably routes all TCP/IP activity on port 80 to the TCP/IP stack 850 in the vmkernel. Other important ports may be picked for TOE routing as well.

All new sockets that are derived from the ports sent to either TCP/IP stack (850 or 1550) will end up using that stack. For example, a web server will do an accept on port 80. The WSPI (Winsock Service Provider Interface) library 1560 at the application layer 1500 will see that port 80 is a port managed by the TOE, so it will send the accept to the TOE. When the web client connects to port 80, the vmkernel examines the TCP/IP header for the packet and determines that this packet should be sent to the TCP/IP stack 850 because the destination IP address and port match. The TCP/IP stack 850 then creates a new "child" socket, which has same the properties as its parent. It also stores the port numbers of both endpoints so all future incoming messages sent to this port number will be directed to the TOE. It then responds to the accept done by the web server and gives the web server the new socket along with the data received on that socket from the remote endpoint.

Incoming packets will be sent to the guest OS stack 1550, however. For example, if an application does an accept on a port not managed by the mechanism according to the invention, say, port 99, then the WSPI library 1560 will send the accept to the guest OS TCP/IP stack 1550. When a client connects at port 99, for example, or any other port not managed by the TOE according to the invention, the vmkernel allows the packet to takes its normal path to the guest TCP/IP stack 1550.

In one embodiment, the port numbers that are generated by the TCP/IP stack 1550 in the guest and the TCP/IP stack 850 in the vmkernel are prevented from conflicting so that the intended recipient of packets will be clear. To prevent such conflicts, the VMM/vmkernel maps the ports for each respective stack into disjoint port spaces in memory. The optimal implementation will be for the TCP/IP stack 850 that is used by the TOE to avoid a certain range of port numbers when it generates port numbers, since it will then be necessary to map only the guest OS port numbers to the range avoided by the TOE stack. In addition, there will not need to be any modifications to the TCP/IP header in packets coming from and going to the TOE stack. This will eliminate the need to redo checksums for TOE streams.

This architecture requires that the vmkernel looks at the TCP/IP header of every incoming packet to determine where to send the packet. This is a cheap operation, however, involving only that the vmkernel look at the IP address and port number in the packet header and then look up the port in a table.

Implementation of Operations

Figure 4:
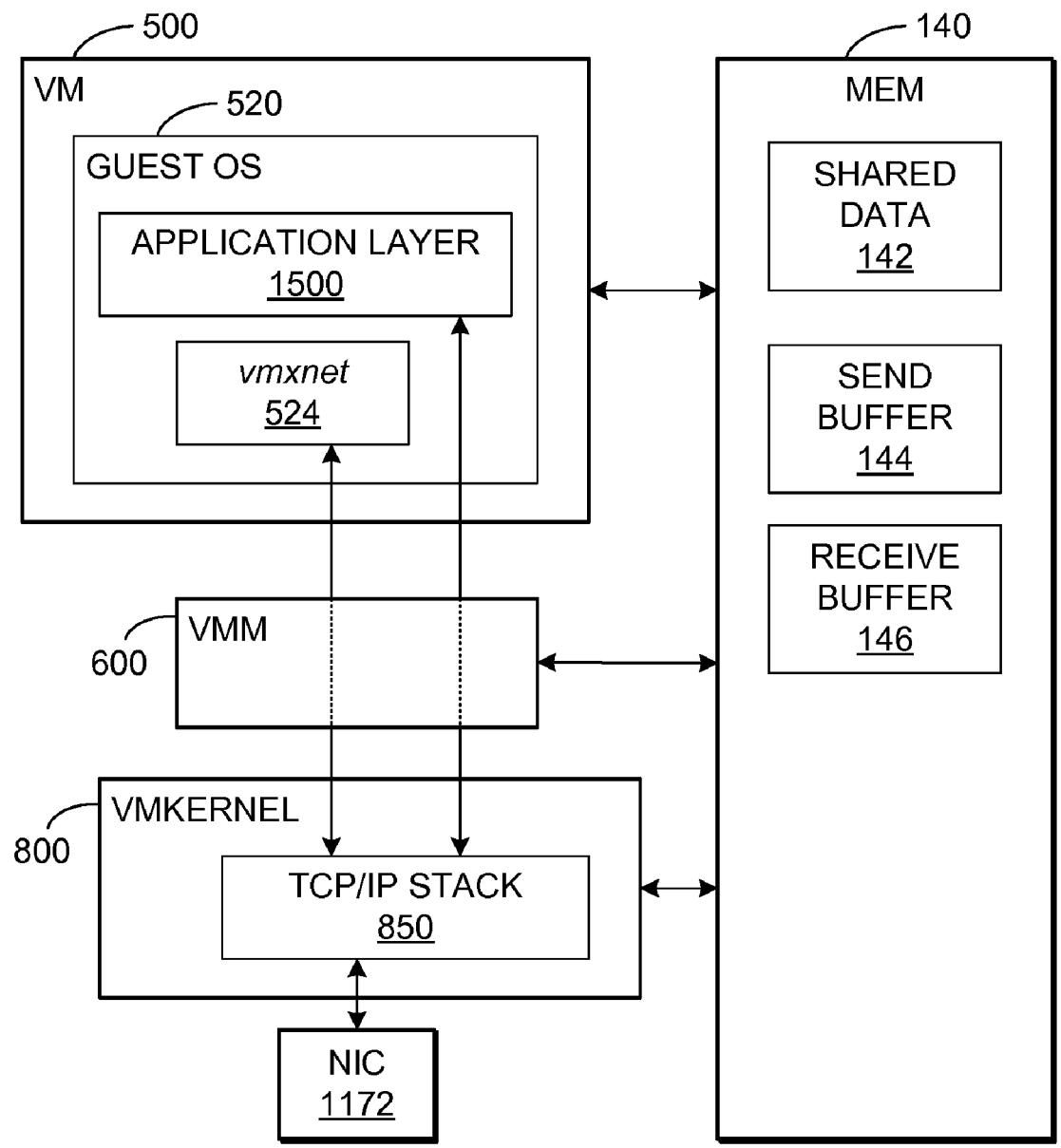
FIG. 4 illustrates packet transfer using shared, pinned data structures in memory.
Figure 5:
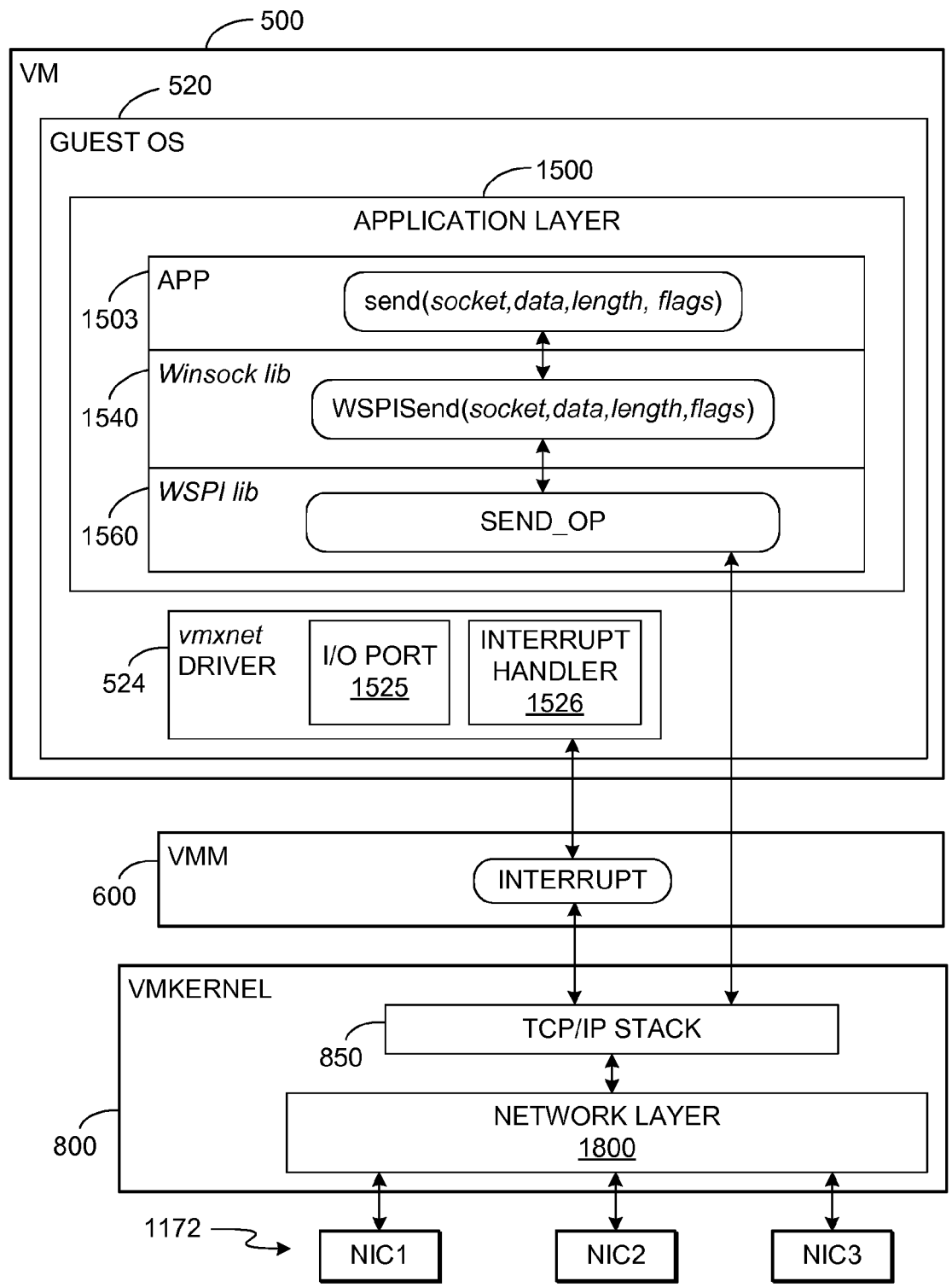
FIG. 5 shows not only the major components of a virtualized computer system that incorporates one aspect of the invention, but also illustrates the sequence of operations and data flow involved in creating a socket and sending data.

In this section is described how all of the "pieces" of the embodiment shown in FIGS. 3-5 work together by discussing each important operation in detail. Note that FIGS. 3 and 5 show both the components of this embodiment of the invention and indications (rounded boxes) of operations performed by the respective components. FIG. 3 gives an example of the flow of creating a TOE socket and connecting to a remote endpoint, for example, and FIG. 5 gives an example of the flow of sending a packet.

Initializing

Before any socket operation can be done, the system must be initialized. On Windows, each application will call a WSPI library initialization routine before it can start using any networking operations. The initialization routine does the following:

1) Allocates memory for the data structures 142 (FIG. 4) that are to be shared between the application layer 1500, the driver 524, an the VMM 600.
2) Allocates memory for send and receive buffers 144, 146.
3) Opens the driver 524.
4) Calls the driver 524 with a pointer to the shared memory structure 142 and the send and receive buffer memory regions 144, 146 as well as an event object that can be used to wait on a socket.

The driver 524 will do the following:
1) Lock down the GPPNs that back the shared data structure 142 and the send and receive buffers 144, 146.
2) Put the GPPNs for the send and receive buffers into the shared data structure 142.
3) Trap to the VMM with the GPPN using an OUT signal to the vmxnet I/O port 1525. The VMM remembers this GPPN for future operations and pins the shared data structure 142 and the send and receive buffers 144, 146.

Creating a Socket

See FIG. 3. When an application wants to create a socket, it calls the standard socket function, which leads to a call to the associated function in the Winsock library 1540. The socket function in the WSPI library 1560 then creates a socket handle (Step 1592), but it does not call into either the TOE or the guest OS TCP/IP stack 1520 until an operation is done on the socket indicating which port number it will be using.

Binding

When an application wants to bind a socket to an address and port number, it calls the bind function. This will end up calling the associated function in the WSPI library 1560. The application name can then be examined and the bind request can be routed to either the native (guest) TCP/IP stack 1550 or the vmkernel TCP/IP stack 850 as appropriate. Alternatively, routing could be based on the port number such that if the port matches one of the ports managed by the invention's TOE, then a new TOE socket is created; otherwise, a socket is created (Step 1593) in the guest OS TCP/IP stack and the bind call is forwarded there.

If a new TOE socket needs to be created, then the following occurs:

1) The operation type in the shared data structure 142 is set to indicate a command to create a socket.
2) An I/O operation is performed by VMTOE.dll on the guest bypass layer.
3) Guest bypass layer in VMM forwards the request to Vmkernel.
4) vmkernel 800 creates a local endpoint and returns the handle back to the DLL.
5) DLL stores this identifier locally with in the identifier that was originally returned to the application.

Once the WSPI library 1560 has the socket ID, it calls the VMM to bind the socket to the given address. This is done in the following manner:

1) The address information for the bind call is put into the shared data structure 142 and the operation type is set to indicate a command to bind.
2) The library traps 1560 to the VMM, which in turn calls the TOE to bind the socket.

When applications wants to bind to a specific port, VMTOE.dll first identifies whether the application is to be offloaded through TOE. If so, it checks to see if the specified port is already in use on the native stack 1550. This may be done by attempting a bind with the same port value on the native TCP/IP stack 1550. If the bind call to the native TCP/IP stack fails then it is likely that there is some other application using the same port value but is not going through TOE. A similar procedure may be used to determine whether a port is already in use by the vmkernel TCP/IP stack 850.

Connecting

When an application wants to connect on a socket it gives an address of where it wants to connect to (Step 1590). This will end up calling the associated function (Step 1591) in the WSPI library 1560. As with binding, the application name can then be examined and the connect request can be routed to either the native (guest) TCP/IP stack 1550 or the vmkernel TCP/IP stack 850 as appropriate; again, this routing could instead be based on the port number.

Accepting

Modern Microsoft operating systems provide different but related mechanisms for configuring a socket to listen to and accept incoming connection requests. Similar mechanisms are found in other OS environments as well. The two principle Microsoft mechanisms, that is, functions, are known as the accept function and its extension, known as the AcceptEx function.

As defined in Microsoft's MSDN Library: "The accept function permits an incoming connection attempt on a socket. The accept function extracts the first connection on the queue of pending connections on [a] socket. It then creates and returns a handle to the new socket. The newly created socket is the socket that will handle the actual connection . . . . The accept function can block the caller until a connection is present if no pending connections are present on the queue, and the socket is marked as blocking. If the socket is marked as nonblocking and no pending connections are present on the queue, accept returns an error . . . . After the successful completion of accept returns a new socket handle, the accepted socket cannot be used to accept more connections. The original socket remains open and listens for new connection requests.

The same library defines AcceptEx as a function that "accepts a new connection, returns the local and remote address, and receives the first block of data sent by the client application . . . . The AcceptEx function combines several socket functions into a single API/kernel transition. The AcceptEx function, when successful, performs three tasks: A new connection is accepted. Both the local and remote addresses for the connection are returned. The first block of data sent by the remote is received."

Either mechanism may be used in this invention. The use of the accept function is described here, and use of the AcceptEx function is described below in the context of an optional feature known as "zero-transitioning accept."

A socket must be bound to an address before an accept operation can be invoked upon it. The TCP/IP will therefore know which stack to direct the accept to. If the accept is for the TOE stack 850, then the following operations are performed:

1) The socket ID in the shared data structure 142 is set to the socket ID to accept on.

2) The operation in the shared data structure 142 is set to indicate a command to accept.

3) The library 1560 traps to the VMM, which in turn calls the TOE to accept on the socket.

4) If there are no pending new connected sockets, then the TOE returns an error code to the library 1560; otherwise it returns the socket ID for the new socket.

5) If the TOE returned the error code then one of two things happens. If the caller to accept wants to block then it will use the mechanism described under the blocking section below; otherwise, this error code will be propagated to the caller. The caller can then use a poll procedure to wait for a new connected socket.

Sending

See FIG. 5. When an application wants to send data via a socket, it calls a send function (Step 1594) with the socket number, the data to be sent, an indication of the length of the data, and any other configured parameters such as flags. This is converted (Step 1595) into an analogous call in the Winsock library 1540 and will end up calling the associated function (Step 1596) in the WSPI library 1560.

A socket must be bound to an address before the send operation can be invoked upon it. Thus, the TCP/IP stack (either 850 or 1550) to direct the send to is known. If the send is for the TOE stack 850 then the following operations are performed:

1) The data to be sent is copied into the send buffer 144 allocated at initialization time.

2) The operation in the shared data structure 142 is set to indicate a command to send and dataStart and the dataLength (or analogous parameters) are set appropriately.

3) The library 1560 traps to the VMM, which in turn calls the TOE to send on the socket.

4) If the socket buffer is full, then the TOE returns the error code to the library 1560 to indicate that the caller would block the transmission; otherwise it returns the number of bytes sent.

5) If the TOE returned the error code then one of two things happens. If the caller to send wants to block then it will use the mechanism described under the Blocking section below; otherwise, this error code is propagated to the caller. The caller can then use poll to wait for space to become available on the socket. The VMM will then interrupt the guest OS, via the driver 524, so that the driver 524 can "wake up" the waiting application. If the amount of data to be sent is larger than the send buffer 144, then multiple send calls to the TOE stack 850 will be required.

Receiving

A socket must be bound to an address before a receive operation can be invoked upon it. Thus, the TCP/IP stack to direct the receive to is known. If the receive is for the TOE stack 850, then the following operations are performed:

1) The operation in the shared data structure 142 is set to indicate a command to receive and dataStart and dataLength are set appropriately.

2) The library 1560 traps to the VMM, which in turn calls the TOE to receive on the socket.

3) If there is no data in the socket, then the TOE returns the error code to the library; otherwise it copies the data into the receive buffer 146 and returns the number of bytes received.

4) Any data that was received is copied into the caller's receive buffer. If enough data was received then the function returns; otherwise it goes back to the VMM to get more data.

5) If the TOE returns the error code then one of two things happens. If the caller to receive wants to block then it will use the mechanism described under the Blocking section below; otherwise, if no data is received then this error code will be propagated to the caller. If some data was received, then the amount of data received will be propagated with no error. In either case the caller can use select to wait for data to become available on the socket.

Selecting

The select operation takes three sets of sockets: a read set, a write set, and an exception set. The caller to select wants to block until one of the sockets in these sets becomes ready or a time limit expires. Upon receiving the select request, VMTOE.dll prepares a poll message with corresponding socket handles, sends the message down to the vmkernel TCP/IP stack, and waits on the locally create event object. When the poll condition is met or time expires, the vmkernel TCP/IP stack signals VMTOE.dll via the vmxnet driver 524. All of the TOE sockets can be waited for via a single event object created and given to the driver 524 at initialization time. Any non-TOE sockets can be waited for by waiting on their socket objects.

Blocking

If the TOE returns the error code, then the application may chose to wait for the blocking condition to clear. This is done by doing a executing poll on the socket handle.

Cleaning Up

When the application is done with a socket, it will call the Winsock library 1540 to close the socket. This will in turn call the WSPI library 1560. If the application exits without closing its sockets, then the driver 524 closes the sockets for it. The vmxnet driver 524 will know when the application exits, because the vmxnet driver gets a notification when the application terminates.

Eliminating Copies

The implementation that was described for send and receive requires a copy from/to the user buffers that are passed into the calls. The physical pages behind these buffers will have been previously pinned in the application's address space and machine pages behind the physical pages will have been pinned into the guest OS memory space. The copy is done to these previously pinned buffers, because this is the safest and most efficient way for the VMM TOE to deal with the data.

As mentioned above, if the actual virtual addresses of the buffers given to the send or receive call were used instead of the pinned buffers, there would be no way that the VMM could do I/O operations to these buffers and know that the I/O is safe, because the guest OS could have been in the process of changing the virtual to physical mapping when the VMM was called. Thus, the only safe way to do I/O to the VMM is if the virtual addresses on which I/O is happening have been pinned in memory.

The copies could be eliminated if one were willing to pin the send or receive buffer parameters on each call. Unfortunately, the cost of pinning a buffer far outweighs the cost of copying the data. However, one could use a lazy pinning/copying strategy that will be able to eliminate copies in some cases. The idea is the following:

1) In the normal case, data is copied.
2) After the same buffer is used enough times, one can chose to pin the buffer instead of copying the data.
3) Maintain a list of pinned buffers and unpin buffers when there are too many pinned buffers or the system realizes that a buffer is no longer being used.

In this manner, commonly used buffers will not have to be copied.

Multithreading Issues

Although the invention is described above in terms of only a single thread accessing the shared data structure 142, this is not necessary for the invention to work, even in a uniprocessor (UP) VM. In an actual implementation of the invention, for example, multiple processes and multiple threads of a single process can all use the offloading features of the invention at the same time. If a single critical code section or data structure is to be shared among multiple guests, then potential conflicts and problems of concurrency may arise, which can be overcome by putting a conventional lock around all accesses to the such critical sections and data structures.

Alternative Architectures and Implementations

An architecture that interposes at the application layer 1500 is described above. A TOE could be used at two lower layers, however. First, one could replace the standard TCP/IP stack in the Windows kernel. There are known interfaces to do this—in Microsoft-based systems, for example, the interface is an AIP called the TDI, which stands for "Transport Driver Interface." This would not be as efficient as coming in at the Winsock layer, but it should be still be more efficient than using the guest's TCP/IP stack 1550.

A second place to put a TOE would be to emulate some NIC that already has a TOE that has been made to work on Windows. This also is not as efficient as coming in at the Winsock layer because of guest kernel virtualization overheads.

Improved TOE Architecture

Figure 6:
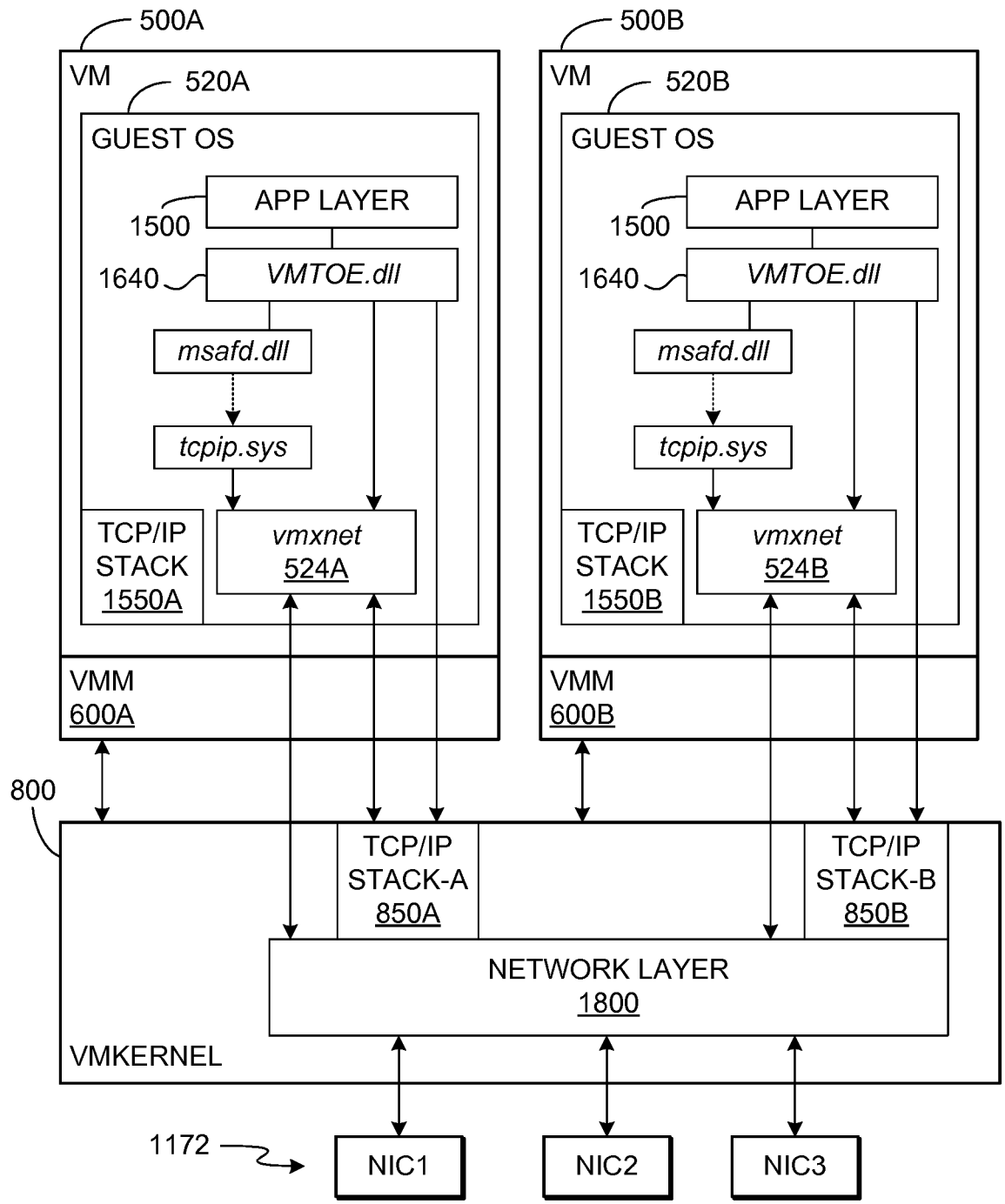
FIG. 6 shows another embodiment of the invention supporting multiple guests.

FIG. 6 illustrates a slightly different configuration of the TOE architecture that is used in modern versions of the VMware ESX Server product. FIG. 6 also illustrates how the offloading mechanism provided by the invention can be used by more than one guest (VM/VMM) at a time; in the figure, two guests are shown and are marked by the suffixes A and B, respectively. Any number of guests (including only one) may be included and will have the same essential configuration. The way this embodiment of the invention works is described with reference to only one of the guests (500A), but the explanation applies equally to all other supported guests.

The three major unique (with respect to the prior art) components of this embodiment of the invention are a DLL (VMTOE.dll 1640), the vmxnet driver 524 and a dedicated TCP/IP stack instance 850A, 850B for each of the respective guests. Of course, analogous or identical components are also found in the embodiment described above. The earlier figures and the description above should therefore be consulted for explanation of components not further discussed below.

As is well known, DLL is a library (for example, the Winsock and WSPI libraries 1546, 1560 shown in FIG. 3) that is dynamically linked to application programs when they are loaded or run rather than as the final phase of compilation. This means that the same block of library code can be shared between several tasks rather than each task having to containing copies of the routines it uses. At run time, ether the system loader or the task's entry code arranges for library calls to be patched with the addresses of the real shared library routines. Note that other operating system environments besides Windows provide mechanisms for dynamic linking similar to the DLL: For example, SunOS uses "shared object files (extension .so) and RISC OS on the Acorn Archimedes uses "relocatable modules." Given this description of the invention, skilled programmers will know how to modify the invention so that it will work in such other environments as well.

FIG. 6 also includes certain other software components that are inherent in the Windows environment. For example, msafd.dll is the standard Windows service provider DLL for TCP/IP and tcpip.sys is the standard Windows driver for TCP/IP operations. These standard components, which will also be present in the earlier described embodiment of the invention, will perform their normal functions. As FIG. 6 illustrates, "normal" TCP/IP I/O requests may be routed through msafd.dll and tcpip.sys, whereas offloaded I/O requests can bypass these standard components as well.

VMTOE.dll 1640 implements standard windows socket APIs. Upon intercepting the windows socket calls, VMTOE.dll 1640 decides whether the call needs to be routed via guest TCP/IP stack 1550A or via vmkernel TCP/IP stack 850A. Note that a similar notion is found in Microsoft's switch layer, which is available for SANs (System Area Networks). However, the Microsoft switching mechanism is "per connection." Furthermore, this known mechanism requires the SAN provider module to gather information identifying the existence of other nodes (endpoints) and to report this information back to the switch layer. This information is required by the switch layer when socket requests must be routed.

In contrast, a specialized DLL such as VMTOE.dll, as used in this invention, enables protocol-processing offload based on the applications. Using known methods, the user can configure what application should be offloaded via the vmkernel TCP/IP stack 850; everything else can then be routed via the guest native stack 1550A.

Note that an "application" may be of any type. For example, the invention has been successfully tested for offloading of even Windows IIS (Internet Information Server) ftp, netperf, ttcp and various other applications. In addition, the invention allows user to specify what applications need to be offloaded via a configuration utility.

The VMTOE.dll component 1660 needs to communicate with the vmxnet driver 524 only during process initialization to setup certain resources that are shared amongst multiple applications running in the same OS. In addition, it sets up certain communication channels that allow processing responses from vmkernel 800 directly from VMTOE.dll without having to transition to guest OS kernel. When VMTOE.dll wants to send requests to the vmkernel TCP/IP stack 850A, it uses a special communication channel directly from user space without involving the guest OS kernel at all.

This significantly improves the performance, as there is no context switch involved in the guest with respect to transitioning from user mode to kernel mode. The communications between VMTOE.dll and vmkernel is asymmetric: When VMTOE.dll wants to make a request for performing a Windows socket call, it prepares a message and sends the physical page of that message to vmkernel directly, via the guest kernel bypass mechanism 650 in the VMM 600 (see FIG. 3).

Consider now what happens when the application wishes to send a message. Upon receiving the message, the TCP/IP stack 850A maps the guest physical page (GPPN) to a virtual address that is accessible to vmkernel 800 and processes the request (for example, in any known manner in the network layer 1800).

When a reply needs to be generated to the VMTOE.dll component, it pulls the eventID located in the original request and puts the eventID in the shared area 142 that is accessible by the vmxnet driver 524 and raises an interrupt to the guest. Upon taking the guest interrupt, the vmxnet driver 524 takes the eventID from the shared memory region 142 and puts the eventID in shared memory accessible to both the VMTOE.dll component 1540 and the vmxnet driver 524. This overcomes the limitation of user-level applications that they cannot intercept device interrupts, which is used in this invention as a signaling mechanism between vmkernel and vmxnet.

As FIG. 6 shows, there is one TCP/IP stack instance per guest. This in itself is novel, and is at present not even provided in hardware-based networking systems. These stacks are established by the VMTOE.dll 1540 sending a message to vmkernel 800. Once a stack instance is set up, the VMTOE.dll gathers the interface and routing information from the guest OS 520 in the conventional manner and sends the information to the TCP/IP stack that is just created. The TCP/IP stack in the vmkernel then uses the same IP addresses and routing tables that guest is configured to use. This avoids having to maintain multiple interfaces, which complicates their networking configuration.

When a packet for the guest 500A is received at the vmkernel network layer 1800 layer, the layer 1800 first hands off the packet to the TCP/IP stack 850A. The stack 850A then pulls up the packet only if the TCP port has been previously associated with the stack, and it then sends the packet to VMTOE.dll. Packets that are not processed by the stack 850A are forwarded to the guest through standard path (via the vmxnet driver 524 and on to the guest's TCP/IP stack 1550A). Combined with the other mechanisms described above in connection with the embodiment of the invention shown in FIGS. 3 and 5, the stack 850A therefore supports full-fledged connection offloading with minimal involvement of the guest OS (and no modification or involvement of the guest OS kernel) and with no need for extensive processing by the VMM.

Efficient AcceptEx Handling in a TOE for Virtual Machines

As explained above, "AcceptEx" is a Winsock API function that provides for expedited connection establishment ("zero-transitioning accept") using overlapped I/O. Using AcceptEx, an application can aggregate the accept and receive calls into one, and be notified when both the accept and receive operations have completed on a socket. In a typical scenario, a server application "posts" a number of AcceptEx requests to its OS kernel. The application then waits to be notified when new connections come in. When notified, the application returns to it the socket on which the connection was accepted, and any data received.

In a traditional, non-virtualized system, switching between the OS kernel and user space is not very expensive, making it possible to efficiently send AcceptEx requests to the kernel, and to receive notifications from it. Context-switching in virtualized systems usually entails much greater overhead, however. In particular, in systems, such as those in which this invention operates, the guest virtual machines will usually be completely isolated from each other, such that transitioning from the VMM to the TOE requires re-mapping the complete virtual address space.

As an extension of this invention, a novel set techniques is provided that allows for AcceptEx posting and notification in the critical path to be conducted with no transitions to-and-from the vmkernel. This is accomplished as follows:

The first time an AcceptEx comes in on a socket, the interposing VMTOE.dll 1540 running in the guest calls down into the vmkernel 800 to create a shared ring between the VM and the TOE. This shared ring then acts as a conduit that allows for information to be effectively shared between the guest OS 520 kernel in the virtual machine and the components of the TOE residing in the vmkernel 800. Sharing is accomplished by mapping a set of virtual machine physical pages (GPPNs) into the vmkernel's address space. After this one-time initialization, all AcceptEx calls on this socket will then be handled without having no transition into the vmkernel at all.

The AcceptEx shared ring described above consists of a number of TOECmd structures, each of which represents an application-posted AcceptEx request. All necessary information required to complete an AcceptEx operation on the designated socket is provided in this structure. What information is necessary will depend on the particular information but will in general be known to skilled programmers.

When a new connection request comes in on a "listen" socket, the vmkernel (for example, the network layer 1800) services it. After the standard TCP three-way handshake is completed on the incoming connection, the TOE creates a socket to represent this connection, using standard procedures. When data arrives on this connection, a TOECmd structure is pulled from the shared ring. Using the information provided in this structure, the TOE then associates its socket with the guest socket, and copies incoming data directly into the physical pages of the virtual machine. Once the read is complete, the TOE posts a notification event using another shared event ring. The notification event is serviced by the vmxnet driver 524 in the guest, which informs the VMTOE.dll component 1540 (running in the context of the requesting user process) of the completed AcceptEx command. VMTOE.dll then returns back to the user process with the results and data from the AcceptEx operation.

Using the above techniques, the TOE is able to service AcceptEx operations for a user process running in a virtual machine with minimal transitioning cost and low service latency. Moreover, because of the CPU savings involved with fewer transitions, the TOE is able to handle a larger number of concurrent connections simultaneously.

Inter-Guest Offloading

Figure 7:
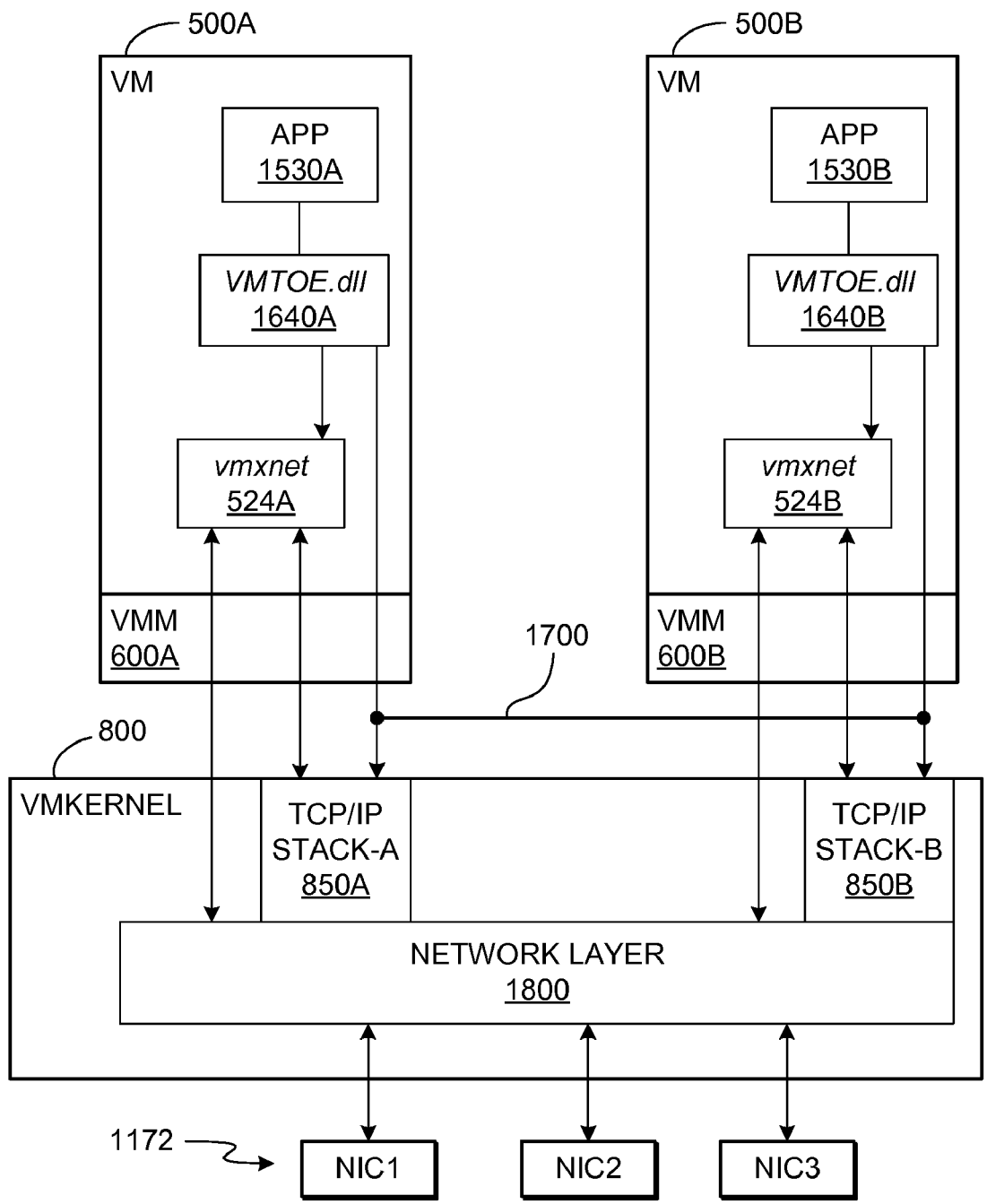
FIG. 7 illustrates inter-guest network traffic optimization for endpoints residing on the same server.

The novel feature of providing a TCP/IP stack 850A, 850B for each guest opens provides yet another optional advantage: Since the stacks are created and are under the control of the TOE components according to the invention, and since the vmkernel 800 is able to control actual I/O to the physical NIC(s), I/O offloading may also be done between guests. FIG. 7 illustrates this possibility.

As before, data paths are shown between two instances of VMTOE.dll 1640A, 1640B and "their" respective kernel stacks 850A, 850B. As symbolized by the heavy line 1700 connecting these two "vertical" data paths, however, it would also be possible for the vmkernel 800 to redirect requests sent by one guest's VMTOE.dll to the stack of another guest but bypassing the normal network packet processing done by any of the TCP/IP stacks 850A, 850B, provided that the kernel does not change the socket number presented to the guest. In addition to the greater speed made possible by bypassing the guest OS kernel for I/O operations, such a feature would also enable the offloading mechanism according to the invention to provide an added level of fault tolerance. Although FIG. 7 illustrates inter-guest offloading for a single pair of guests, any number could of course be logically connected in the same manner.

We claim:

1. A method for offloading input/output (I/O) requests from a protocol stack in a virtual machine executing on a platform comprising hardware and a system software layer, the method comprising:
   intercepting an I/O request from a user-level application executing in the virtual machine, the virtual machine having a guest operating system, the guest operating system having a native protocol stack for processing the I/O request according to a network protocol, the native protocol stack executing within the virtual machine, the intercepting being performed by a software component executing within the virtual machine, the I/O request being normally directed to the native protocol stack;
   directing the I/O request from the application to an offload protocol stack executing in the system software layer; and
   processing the I/O request according to the network protocol using the offload protocol stack.

2. The method of claim 1, wherein the application resides in an application layer of the virtual machine, the method further comprising:
   receiving additional I/O requests from additional applications residing in the application layer of the virtual machine;
   for each of the additional I/O requests, determining whether a corresponding one of the additional applications has been previously designated for offloading of handling of I/O requests; and
   directing the additional I/O requests to either the native protocol stack or to the offload protocol stack on the basis of the determination of the designations of the additional applications.

3. The method of claim 1, wherein the application resides in an application layer of the virtual machine and the network protocol defines a plurality of ports, each of the ports being identified by a port number, the method further comprising:
   associating each port number either with the native protocol stack or the offload protocol stack;
   directing incoming and outgoing network data through the native protocol stack when the data is directed through a port having one of the port numbers associated with the native protocol stack; and
   directing incoming and outgoing network data though the offload protocol stack when the data is directed through a port having one of the port numbers associated with the offload protocol stack.

4. The method of claim 1, wherein the virtual machine is one of a plurality of virtual machines executing on the hardware platform, the method further comprising:
   for each of the virtual machines, instantiating a corresponding offload protocol stack in the system software layer; and
   directing I/O requests from application layers of each of the virtual machines to the corresponding offload protocol stack.

5. The method of claim 4, further comprising:
   offloading I/O requests of one of the virtual machines to the offload protocol stack corresponding to another one of the virtual machines.

6. The method of claim 1, wherein the application resides in an application layer of the virtual machine, the method further comprising:
   in a memory, storing a common data structure and at least one I/O buffer, the common data structure and the I/O buffer being addressable by both the application layer and the system software layer,
   I/O commands stored in the common data structure by the application layer thereby being accessible to the offload protocol stack and data stored in the I/O buffer thereby being accessible to both the offload protocol stack and the application layer without mediation by a kernel of the guest operating system.

7. The method of claim 1, further comprising:
   blocking an application during an I/O request because of a corresponding socket being either not readable or not writable; and
   unblocking the application by issuing an interrupt from the system software layer to a driver installed in the guest operating system, the driver issuing an unblocking notification to the application from the driver in response to the interrupt.

8. The method of claim 1, wherein the software component performing the intercepting comprises a service provider, the method further comprising registering the service provider with the guest operating system to handle the network protocol to allow the service provider to intercept the I/O request.

9. The method of claim 8, wherein the I/O request comprises a socket call.

10. An input/output (I/O) system for a computer, the I/O system comprising:
    a virtual machine having a guest operating system and an application layer, the guest operating system including a native protocol stack for processing I/O requests according to a network protocol from user-level applications residing in the application layer;

a system software layer executing directly on a host hardware platform, the system software layer mediating I/O requests from the virtual machine to the host hardware platform, the virtual machine running on the system software layer;

an offload protocol stack executing in the system software layer; and computer executable instructions executing within the virtual machine for intercepting the I/O requests from the user-level applications and directing at least some of the I/O requests from the user level applications to the offload protocol stack for processing the I/O requests according to the network protocol, thereby bypassing the native protocol stack.

11. The I/O system of claim 10, wherein the computer executable instructions associate each of the I/O requests with one of the user-level applications that issued the I/O requests and determine whether that application has been previously designated for offloading the I/O requests to the offload protocol stack, the computer executable instructions directing the I/O requests to the offload protocol stack only when the I/O requests are issued by applications that have been designated for the offloading of the I/O requests.

12. The I/O system of claim 10, wherein:

the network protocol defines a plurality of ports, each of the ports being identified by a port number; and the computer executable instructions associates each port number with either the native protocol stack or the offload protocol stack and directs incoming and outgoing data through the offload protocol stack when the data is directed though a port having one of the port numbers associated with the offload protocol stack.

13. The I/O system of claim 10, wherein the virtual machine is one of a plurality of virtual machines running on the system software layer, the system further comprising:

for each of the virtual machines, a corresponding offload protocol stack instantiated in the system software layer, each of the offload protocol stacks receiving I/O requests from a corresponding one of the virtual machines.

14. The I/O system of claim 13, wherein each of the offload protocol stacks receive I/O requests from one or more other virtual machines of the plurality of virtual machines than the corresponding one of the virtual machines.

15. The I/O system of claim 10, wherein the computer includes a memory, and the I/O system further comprises a common data structure and at least one I/O buffer stored in the memory, the common data structure and the I/O buffer being addressable by both the application layer and the system software layer, I/O commands stored in the common data structure by the application layer thereby being accessible to the offload protocol stack and data stored in the I/O buffer thereby being accessible to both the offload protocol stack and the application layer without mediation by a kernel of the guest operating system.

16. The I/O system of claim 10, further comprising a driver installed in the guest operating system, the driver comprising computer-executable instructions for issuing an unblocking notification to an application upon receipt of an interrupt signaling an unblocking of the application when the application is blocked due to a socket being either not readable or not writable.

* * * * *